Oct. 3, 1939.　　　　E. J. SVENSON　　　　2,174,850
HYDRAULIC CONTROL AND ACTUATOR MECHANISM
Original Filed Dec. 21, 1931　　5 Sheets-Sheet 3
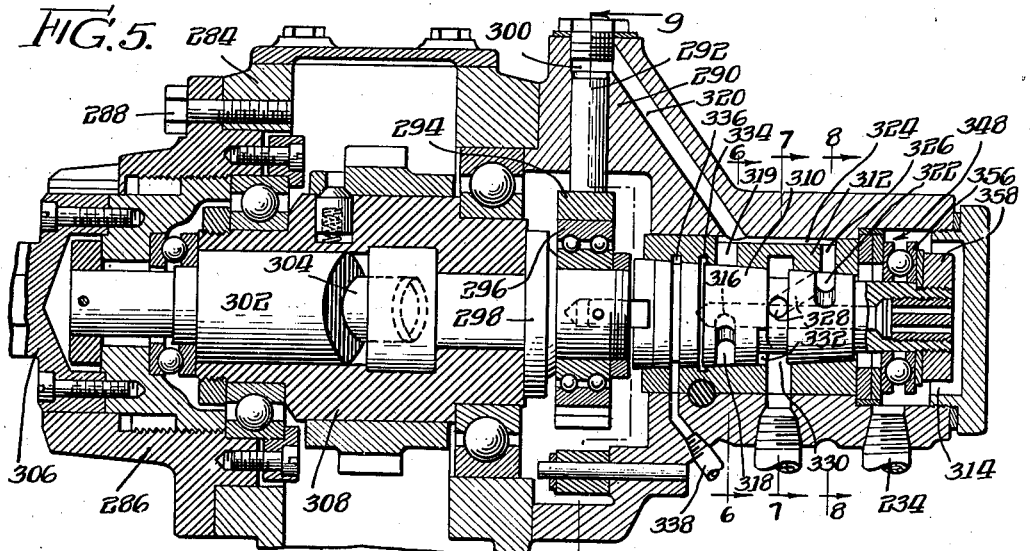
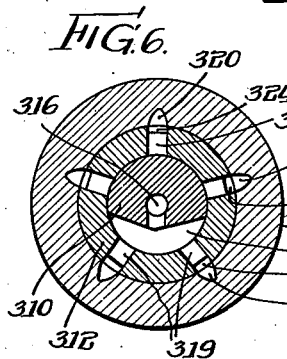
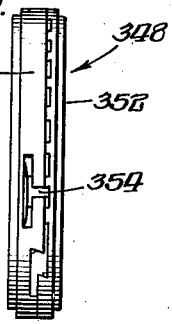
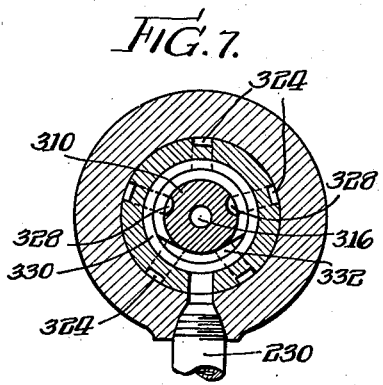
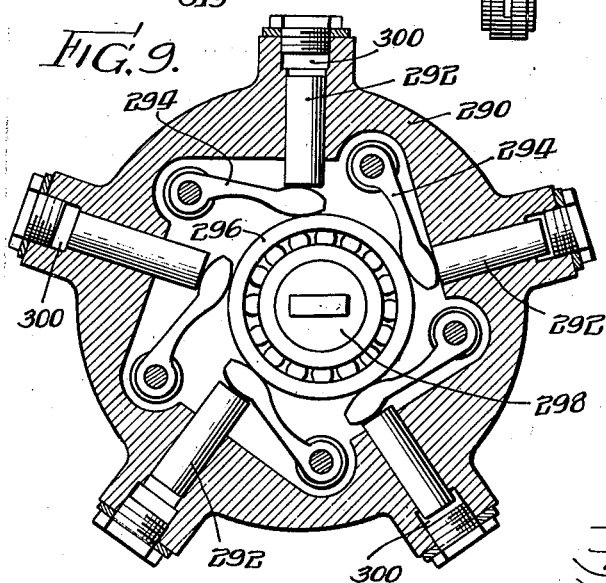
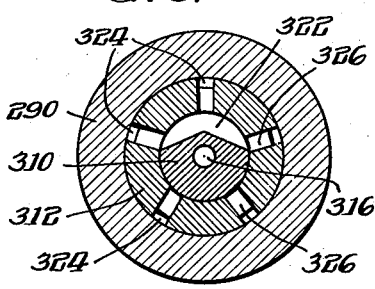
Inventor
Ernest J. Svenson
By: Cox & Moore
attys.

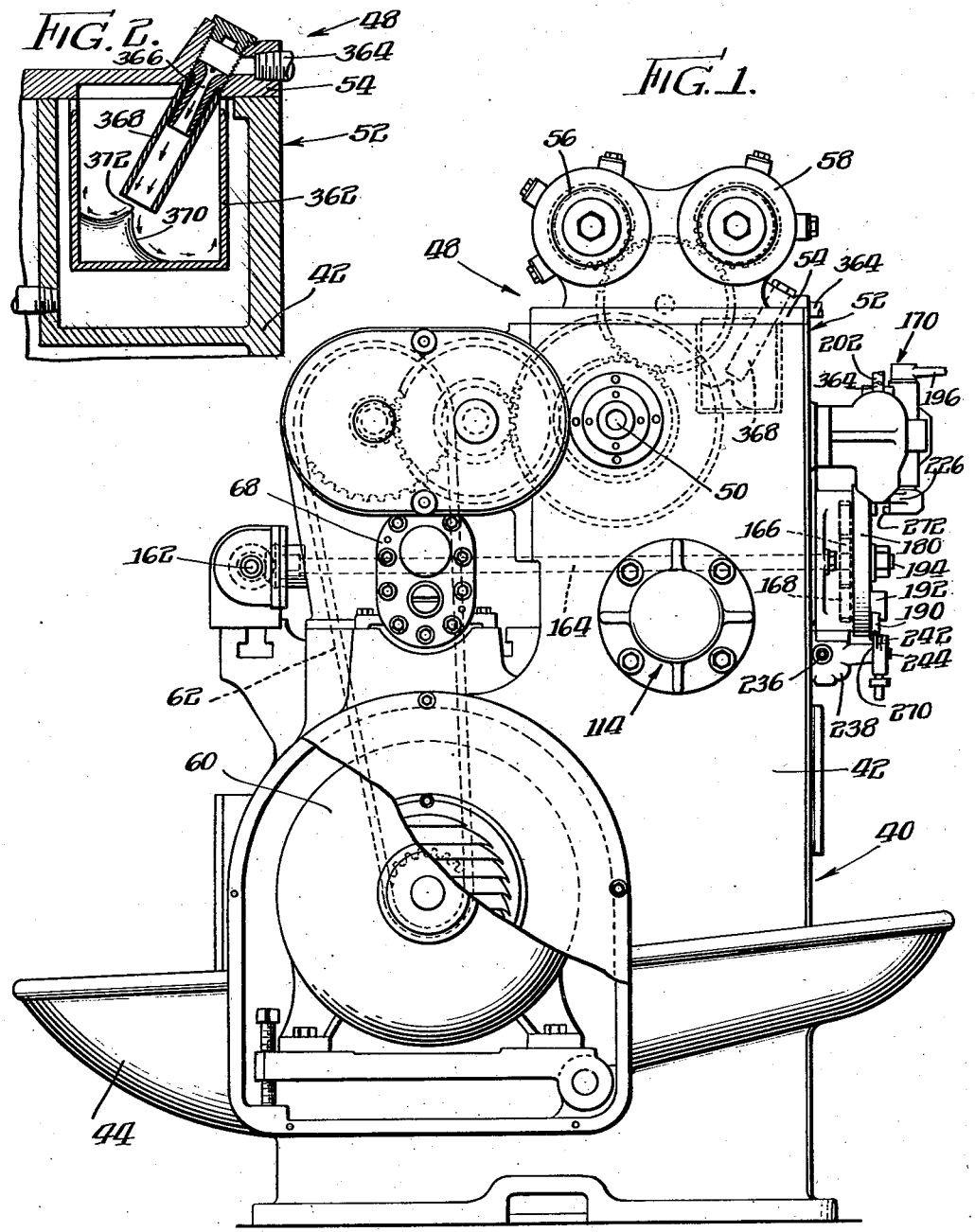

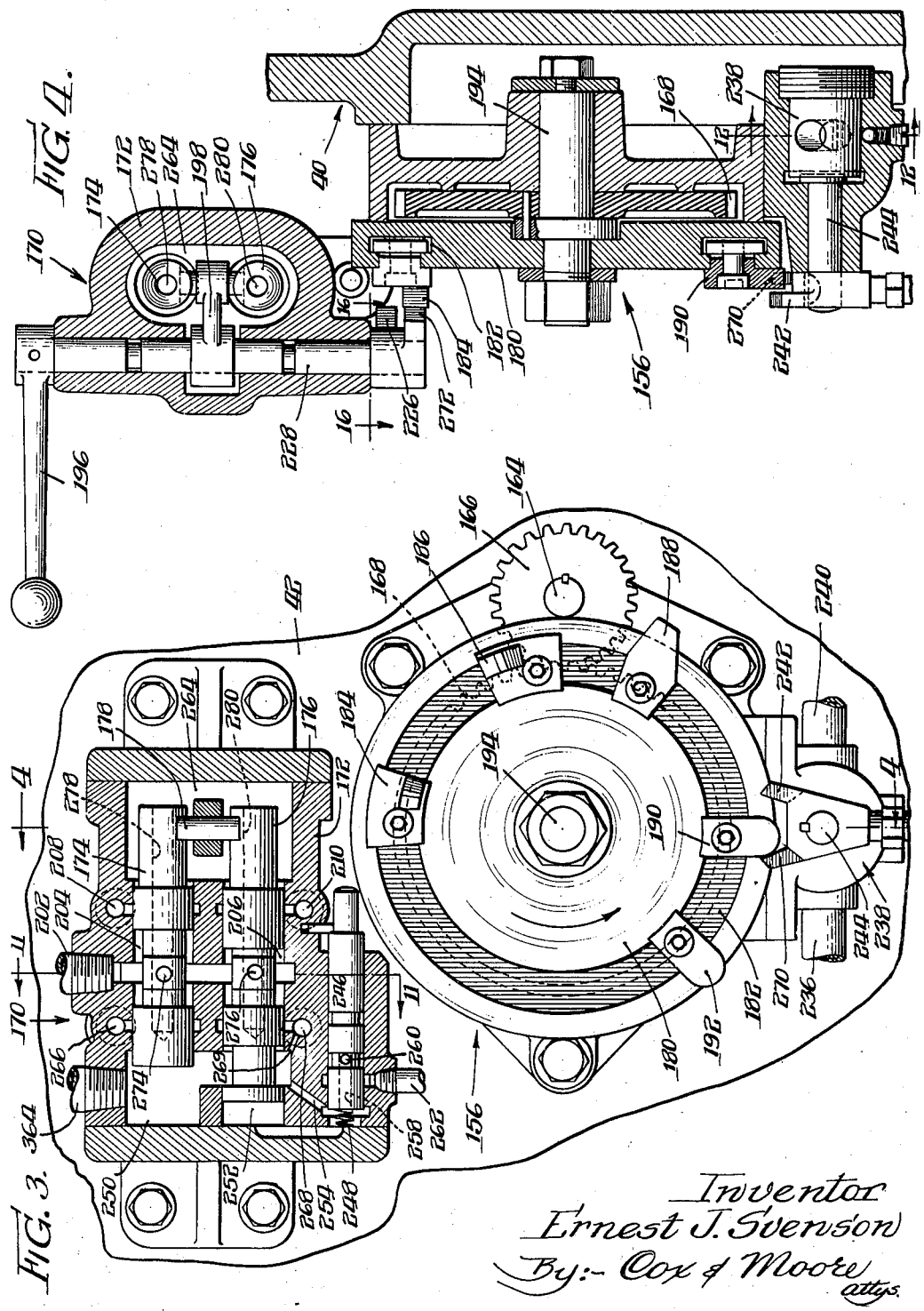

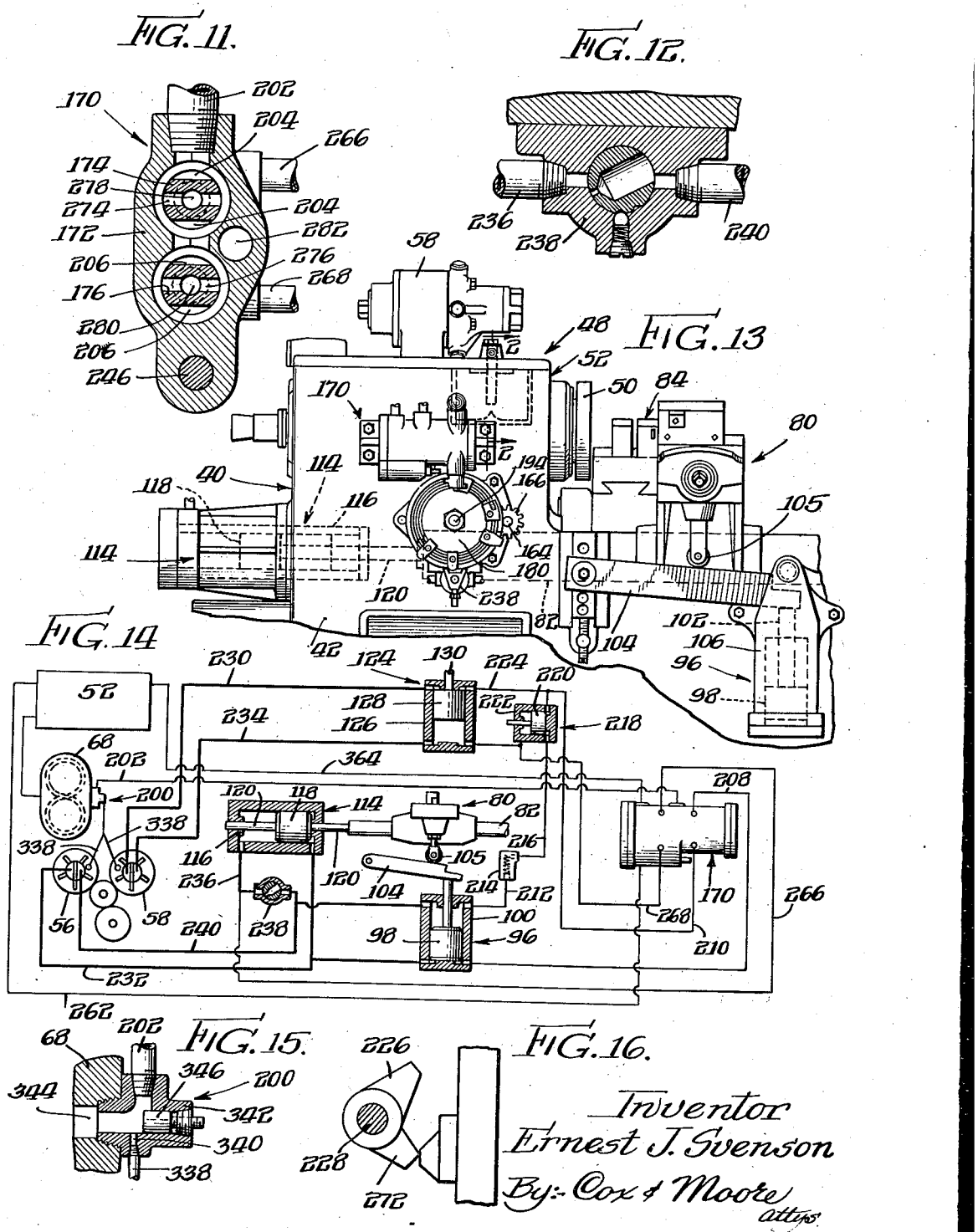

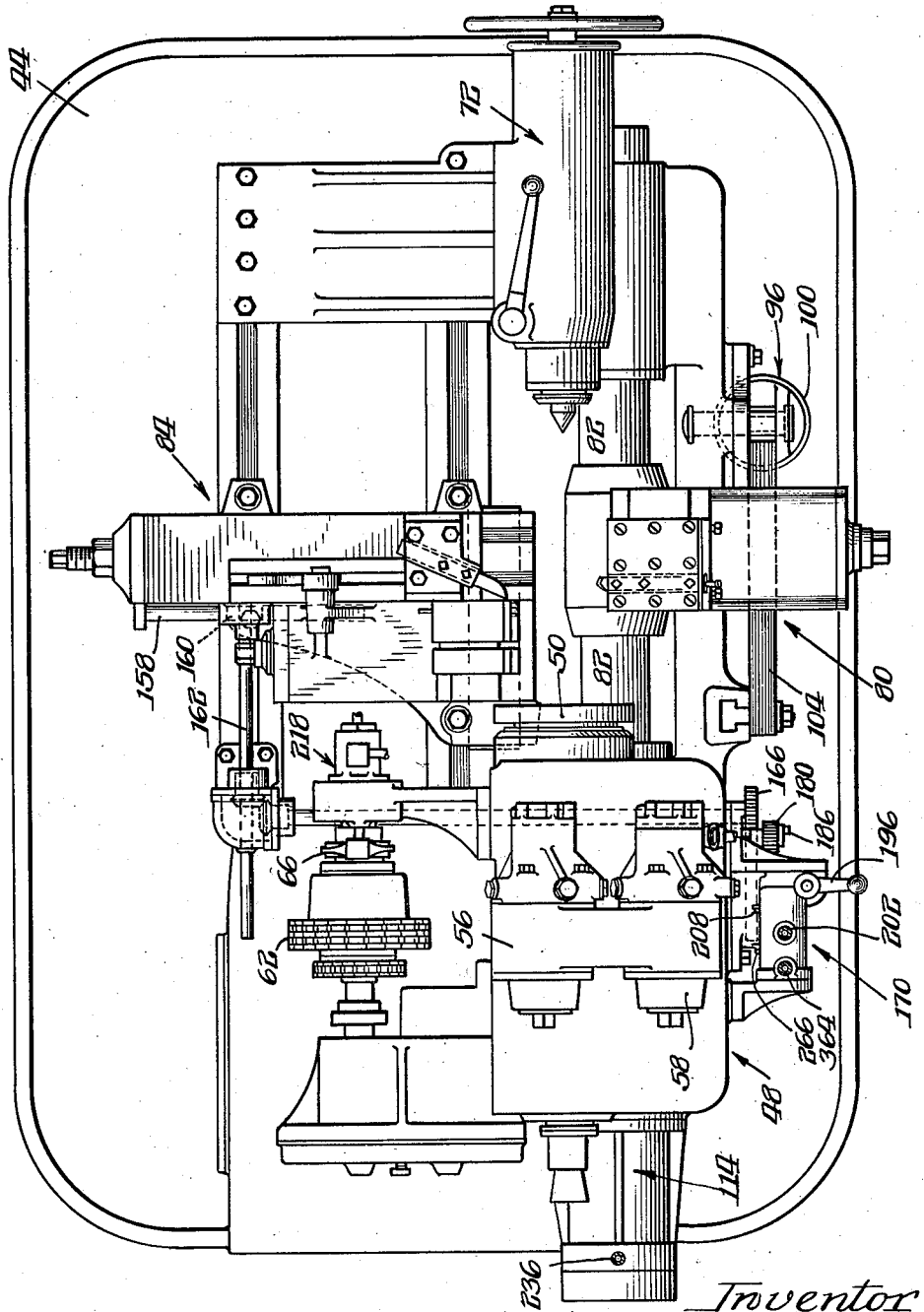

Patented Oct. 3, 1939

2,174,850

UNITED STATES PATENT OFFICE 2,174,850

HYDRAULIC CONTROL AND ACTUATOR MECHANISM

Ernest J. Svenson, Rockford, Ill., assignor to John S. Barnes Corporation, Rockford, Ill., a corporation of Delaware Original application December 21, 1931, Serial No. 582,192, now Patent No. 2,078,697, dated April 27, 1937. Divided and this application April 26, 1937, Serial No. 139,011

37 Claims. (Cl. 82—2)

My invention relates generally to hydraulic control and actuator mechanisms, and the present application is a division of my copending application Serial No. 582,192, filed December 21, 1931 now Patent No. 2,078,697, April 27, 1937.

In said parent application a machine tool, more particularly, an automatic lathe is described and claimed, and in said application I called attention to the demand for material working apparatus or machines which are particularly adapted to effectively employ the relatively tough, hard cutting alloys which have been developed in recent years, such as tungsten carbide, et cetera. This machine was designed with the view of presenting sufficient sturdiness or rigidity for rendering the same particularly adaptable to be equipped with such cutting tools. The present invention contemplates hydraulic control and actuator mechanisms of improved practical construction which cooperate to render a hydraulic actuator more efficiently operable, and in this sense the present invention is by no means limited in its application to machine tools, but is adaptable for use generally in hydraulic actuator systems.

It is an object of the present invention to provide improved control mechanisms for use in hydraulic systems and to this end the invention contemplates the provision of a new and improved tapered valve structure in which the pressure of fluid controlled by the valve is uniformly distributed.

More specifically, the present invention contemplates a valve arrangement as set forth above in which a counter-fluid pressure may be used for preventing slippage of fluid along the periphery of said valve.

The present invention also contemplates the provision of a new and improved plunger pump construction wherein a valve of the type set forth above forms an important constituent element thereof.

It is also an object of the present invention to provide for use in a hydraulic actuator system a unitary frame supporting structure for supporting as a unit, a rotary supporting member or spindle, fluid pressure generating means or pump, and a fluid reservoir whereby fluid may be maintained in association with said rotary supporting member for dissipating heat generated by the rotation of said supporting member or spindle.

It is also an object of the present invention to provide a hydraulic actuator system in which means is provided whereby at least two pressure conditions may be established by fluid which is delivered from a single source of supply, and to this end I propose to direct fluid from a suitable fluid pressure generating means, such as a low pressure pump, in such a manner as to establish two fluid pressure conditions.

The foregoing and numerous other objects and advantages will be more apparent from the following detailed description when considered in connection with the accompanying drawings, wherein—

Figure 1 is an end elevational view of an automatic lathe in which the present invention is embodied;

Figure 2 is an enlarged vertical sectional view of the oil reservoir taken substantially along the line 2—2 of Figure 13;

Figure 3 is an enlarged fragmentary elevational view disclosing the mechanism for controlling the operation of the main control valve, said control valve being shown in central vertical section to more clearly illustrate the structural characteristics thereof;

Figure 4 is a vertical sectional view of the main control valve and operating mechanism therefor, said view being taken substantially along the line 4—4 of Figure 3;

Figure 5 is a central vertical sectional view of one of the high pressure plunger pumps disclosing my improved rotary valve construction;

Figure 6 is a transverse sectional view of the valve structure taken substantially along the line 6—6 of Figure 5;

Figure 7 is a similar view taken along the line 7—7 of Figure 5;

Figure 8 is likewise a similar cross sectional view taken along the line 8—8 of Figure 5;

Figure 9 is a transverse sectional view of the pump taken substantially along the line 9—9 of Figure 5;

Figure 10 is an elevational view of a conventional self-expanding compensator, which is representative of one type of compensator adapted to be employed in combination with my improved rotary tapered valve;

Figure 11 is a detail transverse sectional view of the main control valve taken substantially along the line 11—11 of Figure 3;

Figure 12 is a transverse vertical sectional view of the valve for controlling the longitudinal movement of the front carriage, said view being taken substantially along the line 12—12 of Figure 4;

Figure 13 is a fragmentary front elevational view of the head stock and carriage portions of the lathe to more clearly illustrate the hydraulic control and actuator mechanisms of the present invention;

Figure 14 is a diagram disclosing the general arrangement of the fluid circuits incorporated within my improved system of hydraulic control;

Figure 15 is an enlarged central sectional view of a pressure control device which is coupled with the discharge side of the gear pump;

Figure 16 is a fragmentary plan view taken substantially along the line 16—16 of Figure 4; and Figure 17 is a plan view of the automatic lathe shown in Figures 1 and 13.

In describing the present invention I have found it expedient to disclose certain portions of the lathe structure, but in view of the fact that the present invention is not directed to the lathe or machine tool structure per se, a detailed description and explanation thereof will not be necessary for a clear understanding of the present invention. Therefore, I shall not enter into a detailed description of the machine structures except as such structures may enter into combination with other elements as contemplated by the present invention.

It will suffice to say that the machine tool or automatic lathe disclosed herein comprises a unitary casting 40 which is shown in Figures 1, 2 and 13. This casting 40 includes a machine base or bed 42, and formed integral with the bed and surrounding same is a trough 44 which serves to collect chips, cooling fluid, and the like. Extending upwardly and formed integral with the base or bed 42 at one end thereof is a head stock section designated generally by the numeral 48. This section 48 is cast in one piece with the bed and provides a support for a rotary supporting member or spindle 50.

Particular attention is directed to the fact that this unitary head stock section or frame 48 is not only designed to support or carry the spindle 50, but is also designed to serve as a fluid reservoir designated generally by the numeral 52, see particularly Figure 2. A cover or frame member 54 carried by the unitary frame 48 supports a pair of plunger pumps 56 and 58.

The unitary frame or bed 42 also carries a suitable prime mover or electric motor 60 which is connected, through the agency of a suitable chain 62, with a transmission mechanism including suitable clutch mechanism 66 (Figure 17) which serves to control the delivery of power to the work supporting spindle 50 through suitable gearing shown in Figures 1 and 17. Mounted upon the bed 42 (Figure 1) is a gear pump 68 which is continuously driven from the aforesaid transmission. This gear pump 68 is preferably of the type disclosed in my Patent No. 1,912,737 and is adapted to supply fluid for rapid traverse purposes, while the plunger pumps 56 and 58 are preferably of the variable displacement type which are adapted to deliver fluid at a slower feeding rate.

A front tool carriage is denoted generally by the numeral 80 (Figures 13 and 14) and is mounted upon a horizontally and longitudinally shiftable bar 82. This bar is supported within the bed 42 and the rear tool carriage denoted by the numeral 84 is reciprocably mounted on the rear upper surface of the bed 42, and is adapted to be reciprocated transversely of the axis of the work supporting spindle 50.

The front carriage 80 is adapted to oscillate about the axis of the slidable bar 82, and moves as a unit longitudinally with the bar 82. Movement of the carriage 80 toward the work piece is accomplished through the agency of a hydraulic actuator 96, which includes a piston 98 vertically reciprocable within a cylinder 100. A piston rod 102 extends upwardly and supports the free extremity of an oscillatory guide bar 104, which serves to guide a roller 105. This roller 105 is carried beneath the outer portion of the structure of the oscillatory carriage 80. It will suffice to say that the initial movement experienced by the front carriage 80 is occasioned by the actuator 96, the upward movement of which causes the carriage 80 to swing toward a work piece supported by the spindle 50. A tailstock 72 cooperates with the headstock 48 in supporting a work piece to be acted upon by tools carried by the front and rear carriages 80 and 84, respectively. Longitudinal movement is imparted to the front carriage 80 by a hydraulic actuator indicated generally by the numeral 114, which includes a cylinder 116 and a piston 118, said piston being coupled with the left extremity of the oscillatory and longitudinally shiftable bar 82 by means of a piston rod 120. From the foregoing it will be apparent that the hydraulic actuator 96 serves to move a tool on the carriage 80 into cutting position with respect to a supported work piece, and the hydraulic actuator 114 serves to impart movement to said tool longitudinally of said work piece. The actuator 96 is designed to move the front carriage during the cutting operation at both rapid and feeding rates.

The rear tool carriage 84 is shiftable transversely of the axis of the spindle 50 by means of a hydraulic actuator 124 (Figure 14), which includes a cylinder 126, a piston 128, and a piston rod 130. Movement of the piston rod 130 imparts transverse movement to the rear carriage, and also acts through a suitable rack and pinion mechanism 158—160 (Figure 17) to effect rotation of a horizontally disposed shaft 162. This shaft 162 extends longitudinally of the machine and is geared to a transverse shaft 164. The extremity of the shaft 164, which terminates at the front of the machine, carries a gear 166 (Figures 1 and 3). Thus it will be understood that, when movement is imparted to the rear tool carriage 84 toward the work piece, a clockwise movement will be imparted to the gear 166, and a counter-clockwise movement to the companion gear 168, as viewed in Figure 3.

A rotary valve control mechanism 156 is designed to timingly control the shifting of a main control valve mechanism designated generally by the numeral 170, which is mounted on the front side of the machine in a convenient position to be manipulated by the operator. In order to simplify an understanding of the structural and functional characteristics of the main control valve 170 and the rotary control mechanism 156 therefor, I shall describe these parts in connection with the hydraulic system of control, which governs the timed or synchronous movements of the various lathe elements, such as the tool carriage and the fluid pumps. It will be seen that the valve mechanism 170 includes a casing or housing 172, which supports a pair of reciprocable valve members 174 and 176, said valve members being coupled by means of a connecting element 178. It will also be seen that the rotary control mechanism 156 includes a plate 180 provided with a T slot 182, which is adapted to adjustably receive a plurality of dogs 184, 186, 188, 190, and 192. This plate 180 is rotatable with the gear 168 and is supported by a stub fast 194.

Assume that a cylindrical work piece is properly mounted between the spindle 50 of the headstock 48 and the center of the tailstock 72, and that the front carriage 80 occupies its limited downward position, and that the rear carriage occupies its rear position. Assume further that the valve members 174 and 176 occupy the neutral position shown in Figure 3, and that the dogs on the rotary plate 180 also occupy the relative position shown in Figure 3. The prime mover or electric motor 60 is now operating and causes the gear pump 68 to be activated. The clutch mechanism 66 is positioned so as to disconnect the work supporting spindle 50 from the prime mover, and thus the plunger pumps 56 and 58 are not activated. The operator shifts a control handle 196 (Figure 17) to the left, and said handle, being connected with the valve members 174 and 176 by an arm 198, causes said valve members to be shifted to the right, as viewed in Figure 3. In this shifted position fluid from the gear pump 68 is directed through a distributor mechanism 200 (Figures 14 and 15), later to be described, and thence through a pipe line 202 (Figures 3 and 11), which communicates with a passage 204 of the valve 174 and a passage 206 of the valve 176. The valve passage 204 is now in communication with a pipe line 208, while the passage 206 is closed to a pipe line 210, which connects with the valve mechanism. Fluid within the pipe line 208 passes into the lower end of the cylinder 100 of the actuator 96 (Figure 14), thereby causing the piston 98 to be shifted upwardly. This results in the movement of the tool on the front carriage 80 toward the work piece and in the passage of fluid from the cylinder 100 through a pipe line or conduit 212, a check valve 214, and a conduit 216 which is connected with a hydraulic actuator 218, the latter serving to control the clutch mechanism 66. Fluid thus introduced within the actuator 218 causes a piston 220 to be shifted to the left (Figure 14) within a cylinder 222, and thus establishes driving connection between the prime mover 60 and the work supporting spindle 50. Fluid from the hydraulic actuator 218 passes through a conduit or pipe line 224 into the rear extremity of the cylinder 126 of the rear carriage actuator 124. It will thus be apparent that the shifting of the valve members 174 and 176 to the right (Figure 3) causes the front carriage 80 and the rear carriage 84 to be moved at a rapid rate into cutting position with respect to the work piece.

The advancement of the rear carriage causes the rotary dog support 180 to be shifted in the counter-clockwise direction, as viewed in Figure 3. The dog 186 is eventually moved into engagement with a finger 226 carried at the lower end of a shaft 228, which supports the valve control handle 196, and this causes the valve members 174 and 176 to be returned to the neutral position shown in Figure 3. The plunger pumps 56 and 58 which were automatically actuated upon the establishment of driving connection between the spindle 50 and the prime mover 60 now serve to deliver fluid at high pressure through pipe lines or conduits 230 and 232, respectively (Figure 14). This causes the advancement of the rear tool carriage 84 at a feeding rate across the face of the work piece and the longitudinal travel at a feeding rate of the front tool carriage 80, the tool supported thereby cutting along the periphery of the work piece. Fluid from the advancing side of the actuator piston 128 is directed through a line or conduit 234 back to the plunger pump 58, and fluid from the advancing side of the actuator 118 passes through a conduit 236, a front carriage control valve 238, and a conduit 240 back to the intake side of the pump 56. It will be observed that the dog 192, upon engaging a finger 242 carried by a shaft 244 of the valve 238 (Figure 3) causes said valve to establish communication between the conduits 236 and 240 at the desired interval so as to timingly control the longitudinal travel of the front carriage.

The feeding stroke of the hydraulic actuators 114 and 124 continues until the dog 188 is moved into engagement with the outer end of a valve member 246 (Figure 3). Shifting this valve member to the left against the action of a coil spring 248 effects a sudden establishment of communication between a valve chamber 252 and the fluid reservoir 52. In other words, when the valve member 246 shifts to the left, communication between a passage 254 and the chamber 252 is closed, and fluid from the chamber 252 flows unrestrictedly through a central valve passage 258, a radial port 260, and a pipe line or conduit 262. The sudden release of fluid from the chamber 252 enables the normal fluid pressure within an opposite valve chamber 264 to cause the valve members 174 and 176 to be suddenly shifted to the left. In this position said valve members initiate a flow of fluid in the reverse direction to the hydraulic actuators 124 and 114. Thus, in this reverse position, fluid from the gear pump 68 passes through the valve ports 204 and 206 into pipe lines 266 and 268, respectively, (Figures 3 and 14). Fluid from the pipe line 268 passes into the forward end of the actuator cylinder 126, and also causes the sudden shifting of the clutch controlling actuator piston 220 to the right (Figure 14), thereby disconnecting the source of power from the spindle and plunger pumps. Fluid from the pipe line 266 is directed into the pipe line 236 and thence into the left end of the actuator cylinder 116. It will thus be apparent that the front tool carriage is moved at a rapid rate in a reverse direction, namely, to the right, and that the rear tool carriage is similarly moved into a reverse direction. The dog 190 carried by the rotary support 180 eventually engages a finger 270 oppositely disposed from the finger 242, thereby closing the valve 238, and the dog 184 is eventually moved into engagement with a finger 272 (Figure 4), so as to cause the valve members 174 and 176 to be again shifted to their neutral position. This completes the cycle of operation, which may be repeated by merely shifting the control handle in the manner just described.

It will be noted that, when the valve members 174 and 176 occupy their neutral position, fluid from the rapid traverse or gear pump 68 circulates through radial ports 274 and 276, respectively, which communicate with central valve passages 278 and 280 (Figure 3). These central passages open into the valve chamber 264, which communicates with the opposite valve chamber 250 through a longitudinal connecting passage 282 (Figure 11). It will also be apparent that the instant that the valve members 174 and 176 are suddenly shifted to their reverse position, namely, to the left (Figure 3), the pipe line 208 becomes a return line for the hydraulic actuator 96 (Figure 14), thereby enabling the front carriage to suddenly and automatically shift forwardly so as to bring the tool on the front carriage 80 out of engagement with the work piece.

When the valve members 174 and 176 occupy their neutral position, as shown in Figure 3, they render the gear pump functionally inoperative for propelling purposes, and provide an effective seal for the high pressure circuit. In other words, when the plunger pumps 56 and 58 function to propel their respective hydraulic actuators at a feeding rate, said pumps are connected within closed circuits, the fluid on the discharge side of the actuator piston being sufficient to charge the plunger pump. In fact, fluid from the advancing side of these actuator pistons provides the sole charging fluid for the plunger pumps.

Particular attention is directed to the structure of the plunger pumps 56 and 58, and in this connection special reference is made to Figures 5 and 10, inclusive. Both of the pumps 56 and 58 are identical in construction, and therefore a description of one will suffice for a description of the other. Each of these pumps includes a central casing 284, an end casing section 286 secured thereto by means of bolts 288, and an oppositely disposed end section or support 290. This support 290 houses a plurality of radial reciprocable plungers or pistons 292, the inner ends of which engage the curved surfaces of pivoted fingers 294. These fingers, in turn, rest upon the peripheral surface of a driving ring 296 rotatably supported upon an eccentrically adjustable driving member 298. By displacing the center of the ring 296 from the center, about which the pistons 292 radiate, and then rotating said ring, the pistons are successively urged outwardly to compress fluid in chambers 300. The eccentric adjustment of the driving member 298 is controlled by means of suitable adjusting mechanism, which includes a longitudinally shiftable member 302, which is provided with a projection 304 extending into a companion recess provided in the driving member 298. This projection 304 is inclined with respect to the axis of rotation, and when longitudinal movement is imparted to the member 302 in response to the turning of a cap 306, the driving member 298 is laterally shifted within a driving sleeve 308.

I provide a rotary tapered valve 310 which is mounted within a companion bushing 312. This valve is adapted, upon rotation, to control the flow of fluid toward and away from the piston chambers 300. Thus fluid introduced from the pipe line 234 enters a chamber 314, and from this chamber is directed through a central passage 316, which communicates with a peripheral valve port 318. This valve port 318 successively registers or communicates with radial ports 319 in the bushing 312, which connect with passages 320 provided in the support 290. This peripheral valve port 318 is timed so as to communicate with the piston chambers 300 during the intake stroke of their companion pistons 292, while a similar peripheral valve port 322 is timed to communicate with those piston chambers 300 which are companion to the pistons experiencing their outer or compression stroke. Thus fluid under pressure is directed from the passages 320 through a peripheral passage 324 in the bushing 312, and this passage, in turn, communicates with a radial port 326. Fluid under pressure from these ports 326 is directed through the peripheral valve port 322 and into a passage 328, which communicates with an annular valve passage 330. It should be noted that this annular passage 330 is slightly enlarged at the point designated by the numeral 332 (Figure 5), and fluid from this annular passage passes outwardly through the pipe line 230 into the rear extremity of the hydraulic actuator 124. Likewise, fluid under pressure in the pump 56 passes outwardly through the pipe line 232 to the right end of the hydraulic actuator 114 and the lower end of the actuator 96.

By having the low and high pressure peripheral ports arranged in the manner described above, I am able to positively preclude the valve from experiencing any distortion which might otherwise result from the subjection of the valve to these pressures. It will be seen that the high pressure experienced by the valve in the peripheral port 322 is counteracted or neutralized by the fluid pressure acting within the annular passage 330 adjacent its enlarged portion 332. That is to say, any tendency of the fluid pressure acting on one side of the valve to cause said valve to bind or become distorted, is prevented by the neutralization of pressures on opposite sides of the valve. This neutralization or balancing of the valve is particularly important when the fluid pressure reaches a substantial amount, as, for example, pressures in excess of five hundred pounds per square inch. It should be understood that it is very important to have the tapered valve freely rotatable so as to prevent wear and to maintain a very close, accurate running fit.

It should also be noted that toward the larger end of the valve 310, the pressures acting thereon neutralize one another. Thus, for example, the high pressure fluid within the upper three radial ports 319 shown in Figure 6 act downwardly upon the valve, while the pressure in the two lower radial ports 319 and the peripheral port 318 act upwardly, thereby effecting a substantially balanced condition. Attention is also directed to the fact that by having the low pressure peripheral port 318 spaced axially from the high pressure peripheral port 322 and the communicating annular port 330, the possibility of slippage of fluid between high pressure and low pressure ports is prevented. It will be seen in Figure 8 that the upper three radial passages or ports 326, as well as the peripheral port 322, contain high pressure fluid, while the two lower radial ports 326 contain low pressure fluid. There is sufficient circumferential distance between the low pressure ports 326 and the high pressure ports 326 to positively prevent any slippage of fluid between them. Likewise, in Figure 6 it will be seen that sufficient circumferential distance is provided between the radial ports 319 containing the high pressure fluid and the ports 319 containing the low pressure fluid to prevent such slippage. In other words, by axially spacing the high and low pressure peripheral ports in the manner described, I am able to reduce to a minimum the possibility of fluid slippage between high and low pressure valve ports. Obviously the reduction of slippage is an extremely important factor in connection with pumping devices of the type disclosed herein, because, in the first place, fluid slippage causes serious increases in fluid temperatures, and, in the second place, results in a decided decrease in mechanical and propelling efficiency. Furthermore, pumps such as the pumps 56 and 58, are employed in closed circuits which are so arranged that the fluid discharged by the pump acts against one side of an actuator piston and the fluid displaced by the advancing side of the actuator piston is the sole charging medium introduced within the intake side of the pump. Hence, any slippage of fluid within the system would tend to seriously affect the propelling effectiveness or efficiency of the pump.

Attention is now directed to a pair of grooves 334 and 336 provided at the larger end of the tapered valve 310. The groove 334 communicates with the central valve passage 316 and as such serves to return fluid which might slowly work its way along the surface of the valve to the left, Figure 5, back to the central passage 316. It should be understood that the tapered construction of the valve is such as to provide a fluid seal within the closed circuit described above, and positively prevents the leakage or slippage of fluid longitudinally of the valve toward its larger end to an extent that would impair the efficient functioning of the closed circuit.

To insure proper lubrication of the valve surface extending to the left of the groove 334, Figure 5, I provide the groove 336. This groove 336 is continuously connected through a conduit or pipe line 338 with a passage or port 340 of the distributor mechanism 200, Figures 14 and 15. A similar pipe line or conduit 338 communicates with the rotary valve in the pump 56. A portion of the fluid under pressure from the gear pump 68 is directed through the pipe line or conduit 338 and thereby provide a predetermined amount of fluid pressure within the groove 336. Under normal operating conditions the pressure of the fluid within the groove 336 exceeds the pressure of the fluid in the groove 334, thereby preventing the flow of fluid from the groove 334 to the left, but providing a fluid film along the surface of the valve positioned to the left of the groove 334, Figure 5. In other words, any tendency for a slight migration of fluid along this surface would be from the groove 336 toward the groove 334. Thus it will be apparent that one of the primary functions of the groove 336 is to present a fluid body under increased pressure at the point where the fluid from the groove 334 might not in some instances provide the required amount of lubrication along the surface of the rotary valve at its larger end.

It should also be understood that the groove 336 provides a compensating means to take care of fluctuations or variations in fluid pressure within the hydraulic system of control. Thus, for example, if the pressure of fluid within the low pressure side of the system is suddenly increased above the pressure of the fluid within the groove 336, said groove will permit a compensating flow or migration of fluid from the groove 334 into the groove 336. Such a sudden increase in fluid pressure within the low pressure side of the system takes place when the main control valves 174 and 176 are suddenly shifted from rapid traverse to feed. That is to say, certain of the valve ports within the main control valve 170 are suddenly restricted so as to effect a momentary building up of fluid pressure within the low pressure circuit, and in this instance the groove 336 provides a relief or compensating means. Furthermore, the expansion and contraction of the fluid are similarly compensated for by the groove 336.

At this point it should be understood that my particular rotary valve construction with its compensating grooves has a very practical application when used in connection with various types of apparatus other than lathes. For example, a valve of this type used in connection with a milling machine in which "climbing milling" is performed has a very practical application. By "climbing milling", I mean the milling of a work piece by moving the work piece in the same direction as the rotation of the milling cutter as distinguished from moving a work piece against the rotation of the cutter. In such instances a pressure may be built up on the advancing side of the actuator piston which is in excess of the pressure on the trailing side as compared with the opposite conditions which exist in the actuator pistons when used in the machine described in the present application. The compensating groove 336 of the valve in such instances provides a very practical and efficient operable means for bringing about an automatic or self-adjustment of fluid conditions within the high and low pressure side of the circuits, and, in addition, performs its function of insuring proper lubrication of the valve at its larger end. In fact, my improved valve construction equipped with the particular arrangement of the peripheral valve ports and the peripheral grooves described above presents a very positive fluid seal within a closed circuit, and at the same time insures longevity of the valve and its bearing. When it is appreciated that pumps connected with machines such as automatic lathes, milling machines, boring machines, and the like, are subjected to substantially continuous operation day in and day out, the problem of insuring a true running fit of the tapered valve over an extended period of time is of the utmost importance.

To control the fluid pressure within the groove 336, I provide the distributing means or mechanism 200, which includes a suitable casing 342 which is adapted to be secured within the discharge opening 344 of the gear pump. Figures 14 and 15. An adjustable plug 346 is provided within the casing 342 and the shifting of this plug serves to vary the pressure conditions in accordance with the pressure which is required within the groove 336. Obviously the pressure within the groove 336 is normally above the pressure of the fluid which passes from the gear pump 68 through the pipe line 202 into the main control valve 170.

The distributor mechanism 200 serves as means for establishing two-pressure conditions from a single source. The single source of supply is the gear pump 68, and from this source fluid under different pressures is employed, fluid under one pressure passing through the pipe line 202 and fluid under a higher pressure passing through the conduit 338 to the compensating groove 336. By setting up a counter-pressure in the groove 336, fluid is maintained within the circuit and this counter-pressure is greater than the normal low pressure fluid which is delivered for actuation purposes to the hydraulic actuators.

In order to automatically take up any slight wear in the valve 310, I have inserted a compensator of conventional design indicated generally by the numeral 348, Figures 5 and 10. The particular type of compensator 348, which I have shown for the purpose of illustrating one practical device which may be employed, is a design commonly referred to in the trade as "Wyromat-ick Compensator". For a clear understanding of the present invention it will not be necessary to enter into a detailed discussion on this conventional compensator. It will suffice to say that it includes a pair of adjacently positioned rings 350 and 352, said rings being provided with cooperating cam surfaces and a locking pin or key 354. These rings automatically expand as a result of means provided within the device for effecting relative rotation between the rings, and when the separation becomes great enough to clear the locking pin or key 354, relative rotation of the rings will occur so as to take up any slight wear in the valve. This device is designed to take up less than .0005" axial adjustment. It will be seen that this compensator 348 is inserted between the valve bushing 312 and an anti-friction bearing 356 which is clamped by means of a collar 358 mounted upon the threaded split end of the valve member 310. Obviously other forms of compensator devices for automatically taking up wear may be employed in combination with rotary valves without departing from the spirit and scope of my invention.

In order to preclude the introduction of air within the fluid body of the hydraulic system, I have arranged the reservoir 52 in such a manner as to enable the calm or undisturbed entrance of fluid within said reservoir. It will be apparent from Figure 2 that the reservoir 52 includes an outer casing formed by the frame or bed 42 and an inner casing 362. Fluid which is returned to the reservoir through a pipe line 364, which connects the reservoir with the valve chamber 250, Figure 3, passes through a fixed, restricted orifice 366, Figure 2. It will be seen that this orifice is bell-mouthed on its entrance side and tapers to a larger opening on its egress side. Fluid passes from this orifice through an inclined conduit 368 and is directed against a substantially conical surface 370, which has its apex at 372. This apex 372 is positioned adjacent the mouth of the inclined conduit 368, and fluid from the conduit flows gently along the conical surface 370, which blends into the side walls of the inner reservoir, thereby preventing the fluid from being churned or swirled to such an extent as to develop air pockets or bubbles. In this manner the sudden ingress of the fluid is interrupted so as to preclude the agitation or stirring of the fluid body. In other words, a very calm undisturbed entrance of the fluid within the inner casing 362 takes place as a result of the structural arrangement just described. Fluid from the inner tank 362 overflows into the casing or tank 52. The slow overflow of fluid also contributes toward maintaining the fluid body which is withdrawn from the outer casing, free from air bubbles. To maintain a hydraulic circuit free from air bubbles or pockets is of extreme importance, particularly in connection with hydraulic systems which are employed for moving machine tools and the like. A very small amount of air within a circuit is sufficient to seriously impair the operating efficiency thereof. It should be understood that by employing my hydraulic system of control, I am able to govern the shifting of the tool carriages within a fraction of a thousandth of an inch, and to accomplish this I have not only arranged the hydraulic actuators, pumps, and connecting conduits in such a manner as to provide a closed circuit, but have provided means for positively preventing the introduction of air within the circuit. Devices with which I am familiar have been employed heretofore to remove air from the system, but my improved arrangement must be differentiated therefrom inasmuch as I propose to prevent the air from initially entering the system, thereby avoiding the necessity of removing air from within the conduits forming a part of the hydraulic system of control. The mechanism just described for preventing air from entering the hydraulic system is similar in some respects to the system set forth in my Patent No. 1,985,748 wherein I have disclosed a modified reservoir structure for effecting the calm entrance of fluid. Experience has shown that the inclusion of air within a hydraulic system not only causes pulsating effects resulting from the presence of air pockets, but also causes the fluid to disintegrate. This is particularly true when air is trapped within a fluid, such as oil.

It will be noted that the actuator piston 118 is provided with a piston rod 120 on each side thereof, whereas the actuator piston 128 is provided with a piston rod on only one side thereof. Obviously the volume of fluid displaced from the advancing side of the piston 118 will be equal to the volume of fluid received on the opposite side of the piston, whereas the volume of fluid discharged from the advancing side of the piston 128, as it moves forwardly, will be slightly greater than the volume taken in on the opposite side of the piston due to the presence of the piston rod. To take care of this slight volumetric difference, I provide a vent 269, Fig. 3, which is in continuous communication with the conduit or pipe line 268. This vent is similar in functional characteristics to the vents disclosed in one of my copending applications, Serial No. 439,306, filed March 27, 1930, and a detailed explanation thereof in the present application is not necessary to a clear understanding of the invention. It will suffice to say, however, when a piston is equipped with a piston rod on either side thereof, as shown in the hydraulic actuator 114, a vent, such as the vent 269, is not needed. Both forms of pistons are disclosed in the present application to show that my invention is not limited to any particular form of actuator construction, but is capable of employing pistons equipped with rods on one or both sides thereof. In this connection attention is again directed to the improved fluid compensating arrangement, with which the rotary valve 310 is equipped. By having the grooves 334 and 336 in the valve, a unique sealing of the fluid is obtained, and by this arrangement any change in fluid volume, due to increased heat, et cetera, is compensated for, and the presence of fluid between the grooves positively prevents any fluid from leaving the system when said system is functioning under normal conditions. Attention is also directed to the fact that capillary action along the surface between the grooves 334 and 336 contributes to the sealing effectiveness of the rotary valve.

By causing the returned fluid to be directed against the conical surface 370 within the fluid reservoir and then permitting the fluid from the inner reservoir to slowly overflow into the outer reservoir, I am able to positively prevent air from entering the fluid at this point. By employing such an arrangement with the sealed or closed fluid circuit just described, the conduits thereof will remain free from air pockets. This will enable the tool carriages to be moved without the slightest degree of pulsation and to be accurately timed in their movements within a fraction of a thousandth of an inch.

The unitary arrangement of the headstock frame or housing provides a very practical hydraulic unit structure. The headstock structure actually provides the wall structure for the reservoir and also serves to support the spindle, pumps, driving means, etc., as a complete unit. The spindle is not only supported by the unitary frame structure of the head stock but is so positioned with respect to the fluid contained within the frame, such as the fluid within the reservoir, that heat developed from the rotation of the spindle within its bearings is appreciably dissipated through the contained fluid. Attention is also directed to the fact that the distributor mechanism 200 provides means whereby two pressure conditions from a single source of supply are obtained. That is to say, the mechanism 200 enables fluid delivered by the gear pump to be directed through one conduit at one pressure and through another conduit at another pressure. This is extremely practical in its application to various hydraulic systems of control wherein an auxiliary supply of fluid at a pressure differing from the discharge pressure of the pump is required. By using the mechanism 200, I preclude the necessity of using a second or auxiliary pump.

The foregoing statements regarding the functioning of my improved lathe structure have been substantiated by actual work in the field. Machines constructed in accordance with the teachings of my invention have been subjected to severe actual working conditions in the shop and have materially increased shop production.

Obviously numerous changes and modifications may be made in certain of the structural features described above without departing from the spirit and scope of my invention, said invention being limited only by the scope of the appended claims.

Having thus described my invention, what I claim as new and desire to secure by Letters Patent is:

1. In a hydraulic actuator system, a hydraulic circuit including a hydraulic actuator, a plunger pump adapted to deliver fluid to said actuator, said pump having a support and a plurality of reciprocable plungers therein for subjecting fluid to pressure, a rotary tapered valve in said pump for controlling the flow of fluid toward and away from said plungers, a peripheral port in said valve adapted to successively communicate with the pistons experiencing their compressing stroke, a peripheral port in said valve for successively communicating with the pistons experiencing their intake stroke, said peripheral ports being spaced axially along the surface of said valve, and means for automatically maintaining said valve in proper position of adjustment to insure the circuit against fluid leakage.

2. In a hydraulic actuator system, a hydraulic circuit including a hydraulic actuator, a plunger pump adapted to deliver fluid to said actuator, said pump having a support and a plurality of reciprocable plungers therein for subjecting fluid to pressure, a rotary tapered valve in said pump for controlling the flow of fluid toward and away from said plungers, a peripheral port in said valve adapted to successively communicate with the pistons experiencing their compressing stroke, a peripheral port in said valve for successively communicating with the pistons experiencing their intake stroke, said peripheral ports being spaced axially along the surface of said valve, passageways in said valve communicating with said ports whereby to neutralize the fluid pressures acting on the sides of the valve to thereby maintain the free and accurate running fit of said valve, and means for automatically maintaining said valve in proper position of adjustment to insure the circuit against fluid leakage.

3. In a hydraulic actuator system, a hydraulic circuit including a hydraulic actuator, a plunger pump adapted to deliver fluid to said actuator, said pump having a support and a plurality of reciprocable plungers therein for subjecting fluid to pressure, a rotary tapered valve in said pump for controlling the flow of fluid toward and away from said plungers, a peripheral port in said valve adapted to successively communicate with the pistons experiencing their compressing stroke, a peripheral port in said valve for successively communicating with the pistons experiencing their intake stroke, a peripheral groove in said valve continuously in communication with the low pressure side thereof, a second groove spaced from the first groove and adapted for communication with an external source of fluid supply, and means for automatically maintaining said valve in proper position of adjustment to insure the circuit against fluid leakage.

4. In a hydraulic actuator system, a hydraulic circuit including a hydraulic actuator, a plunger pump adapted to deliver fluid to said actuator, said pump having a support and a plurality of reciprocable plungers therein for subjecting fluid to pressure, a rotary tapered valve in said pump for controlling the flow of fluid toward and away from said plungers, a peripheral port in said valve adapted to successively communicate with the pistons experiencing their intake stroke, a peripheral groove in said valve continuously in communication with the low pressure side thereof, a second groove spaced from the first groove and adapted for communication with an external source of fluid supply, and means for maintaining fluid pressure within said second mentioned peripheral groove which is in excess of the normal low pressure fluid within the other groove, and means for automatically maintaining said valve in proper position of adjustment to insure the circuit against fluid leakage.

5. In a hydraulic actuator system, a hydraulic circuit including a hydraulic actuator having a piston shiftable within a cylinder for propelling a machine element or the like, a pump for supplying fluid to said actuator, said pump including a plurality of reciprocable pistons, a rotary valve for controlling the flow of fluid toward and away from said pistons, means associated with the valve to compensate for variation in fluid pressures acting upon said valve, and means to automatically compensate for wear experienced by said valve during rotation whereby to insure the circuit against fluid leakage.

6. A hydraulic actuator system including a fluid pump and a valve mechanism for controlling fluid delivered by said pump, a fluid reservoir for receiving fluid discharged by the pump, said reservoir including inner and outer fluid containers and having a curved surface positioned at the point where the fluid initially enters the inner container, whereby to counteract any tendency to agitate the fluid body and thereby prevent the introduction of air within said body, and means for conducting fluid from said reservoir to said fluid pump.

7. A hydraulic actuator system including a fluid pump and a valve mechanism for controlling fluid delivered to said pump, a fluid reservoir for receiving fluid discharged by the pump, said reservoir including inner and outer fluid containers and having a curved surface terminating in an apex and positioned at the point where the fluid enters the inner container, whereby to counteract any tendency to agitate the fluid body and thereby prevent the introduction of air within said body, and means for conducting fluid from said reservoir to said fluid pump.

8. In a hydraulic actuator system, a hydraulic actuator including a piston within a cylinder, a rapid traverse pump for imparting rapid movement to said actuator, a high pressure pump for imparting feeding movement to said actuator, said latter pump including a support having a plurality of reciprocable pistons and a rotary valve for controlling the flow of fluid toward and away from said pistons, and a distributor mechanism positioned at the discharge side of said rapid traverse pump, said distributor mechanism including means for delivering a portion of the fluid discharged by said pump to said actuator and the remaining portion to the peripheral surface of the rotary valve in said high pressure pump.

9. In a hydraulic actuator system, a hydraulic actuator including a piston within a cylinder, a rapid traverse pump for imparting rapid movement to said actuator, a high pressure pump for imparting feeding movement to said actuator, said latter pump including a support having a plurality of reciprocable pistons and a rotary valve for controlling the flow of fluid toward and away from said pistons, said rotary valve having a peripheral groove, and a distributor mechanism positioned at the discharge side of said rapid traverse pump, said distributor mechanism including means for delivering a portion of the fluid discharged by said pump to said actuator and the remaining portion to the peripheral groove of the rotary valve in said high pressure pump.

10. A valve mechanism for receiving fluid under one pressure and dispatching same under another pressure, including a bearing, a valve member in said bearing, said valve member and bearing being relatively rotatable, the complementary bearing surfaces thereof varying in diameter, a peripheral port in said valve member for timingly controlling the dispatchment of fluid under the one pressure, complementary fluid conducting means in said bearing member, a peripheral port in said valve for dispatching fluid under the other pressure, and complementary fluid conducting means in said bearing member, said peripheral ports on the valve member being spaced axially along the surface thereof in a manner to balance the pressures acting upon said valve member.

11. A valve mechanism for receiving fluid under one pressure and dispatching same under another pressure, including a bearing, a valve member in said bearing, said valve member and bearing being relatively rotatable, the complementary bearing surface thereof varying in diameter, a peripheral port in said valve member for timingly controlling the dispatchment of fluid under the one pressure, complementary fluid conducting means in said bearing member, a peripheral port in said valve for dispatching fluid under the other pressure, complementary fluid conducting means in said bearing member, said peripheral ports on the valve member being spaced axially along the surface thereof, and passageways in said valve communicating with said ports whereby to neutralize the pressures acting on the sides of the valve to thereby maintain the free and accurate running fit of said valve and bearing.

12. A valve mechanism for receiving fluid under one pressure and dispatching same under another pressure, including a bearing, a valve member in said bearing, said valve member and bearing being relatively rotatable, the complementary bearing surfaces thereof varying in diameter, a peripheral port in said valve member for timingly controlling the dispatchment of fluid under the one pressure, complementary fluid conducting means in said bearing member, a peripheral port in said valve for dispatching fluid under the other pressure, complementary fluid conducting means in said bearing member, peripheral fluid receiving means in said valve continuously in communication with the low pressure side thereof, and a second peripheral fluid receiving means spaced from said first peripheral fluid receiving means and adapted for communication with an external source of fluid supply.

13. In a hydraulic actuator system, a valve mechanism for receiving fluid under one pressure and dispatching same under another pressure, said valve mechanism including a bearing, a valve member in said bearing, said valve member and bearing being relatively rotatable, the complementary bearing surfaces thereof varying in diameter, a peripheral port in said valve member for timingly controlling the dispatchment of fluid under the one pressure, complementary fluid conducting means in said bearing member, a peripheral port in said valve for dispatching fluid under the other pressure, complementary fluid conducting means in said bearing member, peripheral fluid receiving means continuously in communication with the low pressure side of said valve, a second peripheral fluid receiving means spaced from the first peripheral fluid receiving means and adapted for communication with an external source of fluid supply, and means for maintaining fluid pressure within said second mentioned peripheral fluid receiving means which is in excess of the normal fluid pressure within the first peripheral fluid receiving means.

14. In a hydraulic system, a hydraulic circuit including a plunger support, a plurality of reciprocable plungers therein for subjecting fluid to pressure, a hydraulic actuator for receiving fluid from said plungers, a valve mechanism including a bearing, a valve member in said bearing, said valve member and bearing being relatively rotatable, the complementary bearing surfaces thereof varying in diameter to counteract fluid slippage along said surfaces, a peripheral port in said valve adapted to successively communicate with said plungers during their compression stroke, and a peripheral port in said valve for successively communicating with said plungers during their intake stroke, said ports being axially spaced along the surface of said valve in a manner to balance the pressures acting upon said valve member.

15. In a hydraulic system, a hydraulic circuit including a plunger support, a plurality of reciprocable plungers therein for subjecting fluid to pressure, a hydraulic actuator for receiving fluid from said plungers, a valve mechanism including a bearing, a valve member in said bearing, said valve member and bearing being relatively rotatable, the complementary bearing surfaces thereof varying in diameter to counteract fluid slippage along said surfaces, a peripheral port in said valve adapted to successively communicate with said plungers during their compression stroke, a peripheral port in said valve for successively communicating with said plungers during their intake stroke, said ports being axially spaced along the surface of said valve, and passageways communicating with said ports whereby to neutralize the fluid pressures acting on the sides of the valve to thereby maintain the free and accurate running fit of said valve.

16. In a hydraulic system, a hydraulic circuit including a plunger support, a plurality of reciprocable plungers therein for subjecting fluid to pressure, a hydraulic actuator for receiving fluid from said plungers, a valve mechanism including a bearing, a valve member in said bearing, said valve member and bearing being relatively rotatable, the complementary bearing surfaces thereof varying in diameter to counteract fluid slippage along said surface, a peripheral port in said valve adapted to successively communicate with said plungers during their compression stroke, a peripheral port in said valve for successively communicating with said plungers during their intake stroke, a peripheral fluid receiving means associated with said valve which is continuously in communication with the low pressure side thereof, and a second peripheral fluid receiving means spaced from the first peripheral fluid receiving means and adapted for communication with an external source of fluid supply.

17. In a hydraulic system, a hydraulic circuit including a plunger support, a plurality of reciprocable plungers therein for subjecting fluid to pressure, a hydraulic actuator for receiving fluid from said plungers, a valve mechanism including a bearing, a valve member in said bearing, said valve member and bearing being relatively rotatable, the complementary bearing surfaces thereof varying in diameter to counteract fluid slippage along said surfaces, a peripheral port in said valve adapted to successively communicate with said plungers during their compression stroke, a peripheral port in said valve for successively communicating with said plungers during their intake stroke, a peripheral fluid receiving means associated with said valve which is continuously in communication with the low pressure side thereof, a second peripheral fluid receiving means spaced from the first peripheral fluid receiving means and adapted for communication with an external source of fluid supply, and means for maintaining fluid pressure within said second peripheral fluid receiving means which is in excess of the normal pressure of the fluid within the first peripheral fluid receiving means.

18. A valve mechanism for receiving fluid under one pressure and dispatching same under another pressure, including a bearing, a valve member in said bearing, said valve member and bearing being relatively rotatable, the complementary bearing surfaces thereof varying in diameter, a peripheral port in said valve member for timingly controlling the dispatchment of fluid under the one pressure, complementary fluid conducting means in said bearing member, a peripheral port in said valve for dispatching fluid under the other pressure, complementary fluid conducting means in said bearing member, and means for maintaining said valve and bearing in predetermined cooperative relation.

19. A valve mechanism for receiving fluid under one pressure and dispatching same under another pressure, including a bearing, a valve member in said bearing, said valve member and bearing being relatively rotatable, the complementary bearing surfaces thereof varying in diameter, a peripheral port in said valve member for timingly controlling the dispatchment of fluid under the one pressure, complementary fluid conducting means in said bearing member, a peripheral port in said valve for dispatching fluid under the other pressure, complementary fluid conducting means in said bearing member, and mechanically operable means for automatically taking up wear experienced by the valve and bearing.

20. A plunger pump construction including a support having a plurality of reciprocable plungers therein for subjecting fluid to pressure, a rotary tapered valve in said pump for controlling the flow of fluid toward and away from said plungers, a peripheral port in said valve adapted to successively communicate with the pistons experiencing their compressing stroke and a peripheral port in said valve for successively communicating with the pistons experiencing their intake stroke, said peripheral ports being spaced axially along the surface of said valve in a manner to balance the fluid pressure acting upon said valve.

21. A plunger pump construction including a support having a plurality of reciprocable plungers therein for subjecting fluid to pressure, a rotary tapered valve in said pump for controlling the flow of fluid toward and away from said plungers, a peripheral port in said valve adapted to successively communicate with the pistons experiencing their compressing stroke and a peripheral port in said valve for successively communicating with the pistons experiencing their intake stroke, said peripheral ports being spaced axially along the surface of said valve, and passageways in said valve communicating with said ports whereby to neutralize the fluid pressures acting on the sides of the valve to thereby maintain the free and accurate running fit of said valve.

22. A plunger pump construction including a support having a plurality of reciprocable plungers therein for subjecting fluid to pressure, a rotary tapered valve in said pump for controlling the flow of fluid toward and away from said plungers, a peripheral port in said valve adapted to successively communicate with the pistons experiencing their compressing stroke and a peripheral port in said valve for successively communicating with the pistons experiencing their intake stroke, a peripheral groove in said valve continuously in communication with the low pressure side thereof, and a second groove spaced from the first groove and adapted for communication with an external source of fluid supply.

23. A fluid reservoir structure including an outer fluid container, a fluid container within said first container, and means for conducting fluid into said inner container, said inner container having a curved surface positioned at the point where the fluid initially enters whereby to counteract any tendency to agitate the fluid body and thereby prevent the introduction of air within said body.

24. A fluid reservoir structure including an outer fluid container, a fluid container within said first container, and means for conducting fluid into said inner container, said inner container having a curved surface terminating in an apex and positioned at the point where the fluid enters whereby to counteract any tendency to agitate the fluid body and thereby prevent the introduction of air within said body.

25. A fluid reservoir structure including an outer fluid container, a fluid container within said first container, and means inclined with respect to the vertical for conducting fluid into said inner container, said inner container having a curved surface positioned at the point where the fluid enters whereby to counteract any tendency to agitate the fluid body and thereby prevent the introduction of air within said body.

26. A hydraulic unit structure including a unitary frame structure, a rotary supporting member carried by said unitary frame, a fluid pump associated with said frame, driving means for said pump carried by the frame, and a fluid reservoir within said frame, portions of said frame providing wall portions of said reservoir, the fluid within said frame being so positioned with respect to said rotary supporting member as to facilitate in dissipating heat resulting from rotation of said supporting member within said frame.

27. A hydraulic unit structure including a unitary frame structure, a rotary supporting member carried by said unitary frame, a fluid pump associated with said frame, driving means for said pump carried by the frame, a fluid reservoir within said frame, portions of said frame providing wall portions of said reservoir, the fluid within said frame being so positioned with respect to said rotary supporting member as to facilitate in dissipating heat resulting from rotation of said supporting member within said frame, and fluid retarding means within said reservoir.

28. A hydraulic unit structure including a unitary frame structure, a bearing within said frame, a rotary supporting spindle carried by said bearing in said unitary frame, a fluid pump associated with said frame, driving means for said pump carried by the frame, driving means for said spindle carried by said frame, and a fluid reservoir within said frame, portions of said frame providing wall portions of said reservoir, the fluid within said frame being so positioned with respect to said rotary supporting member as to facilitate in dissipating heat resulting from rotation of said supporting member within said frame.

29. In a hydraulic actuator system, a hydraulic circuit including a hydraulic actuator, and a plunger pump adapted to deliver fluid to said actuator, said pump including a support having a plurality of reciprocable plungers therein for subjecting fluid to pressure, a rotary tapered valve in said pump for controlling the flow of fluid toward and away from said plungers, a peripheral port in said valve adapted to successively communicate with the pistons experiencing their compressing stroke, a peripheral port in said valve for successively communicating with the piston experiencing their intake stroke, said peripheral ports being spaced axially along the surface of said valve, and means for automatically maintaining said valve in proper position of adjustment to insure the circuit against fluid leakage.

30. In a hydraulic actuator system, a hydraulic actuator, and a plunger pump adapted to deliver fluid to said actuator, said pump including a support having a plurality of reciprocable plungers therein for subjecting fluid to pressure, a rotary tapered valve in said pump for controlling the flow of fluid toward and away from said plungers, a peripheral port in said valve adapted to successively communicate with the pistons experiencing their compressing stroke, a peripheral port in said valve for sucessively communicating with the pistons experiencing their intake stroke, said peripheral ports being placed axially along the surface of said valve, and passageways in said valve communicating with said ports whereby to neutralize the fluid pressures acting on the sides of the valve to thereby maintain the free and accurate running fit of said valve.

31. In a hydraulic actuator system, a hydraulic actuator, a plunger pump adapted to deliver fluid to said actuator, said pump including a support having a plurality of reciprocable plungers therein for subjecting fluid to pressure, a rotary tapered valve in said pump for controlling the flow of fluid toward and away from said plungers, a peripheral port in said valve adapted to successively communicate with the pistons experiencing their intake stroke, a peripheral groove in said valve continuously in communication with the low pressure side thereof, a second groove spaced from the first groove and adapted for communication with an external source of fluid supply, and means for maintaining fluid pressure within said second mentioned peripheral groove which is in excess of the normal low pressure fluid within the other groove.

32. In a hydraulic actuator system a hydraulic actuator, a plunger pump adapted to deliver fluid to said actuator, said pump having a plurality of plungers, valve means for controlling the dispatchment of fluid to and from the plungers of said pump, and means for supplying fluid pressure to counteract the fluid pressure experienced by said valve in dispatching fluid to and from said plungers, said counter-pressure serving to preclude the leakage of fluid from said valve means.

33. In a hydraulic actuator system, a hydraulic actuator, high pressure pump means for delivering fluid to said actuator, low pressure pump means for delivering fluid to said actuator, valve means for controlling the timed functioning of said pump means whereby to enable the first pump when operating to be connected in a high pressure circuit and to enable the second pump when operating to be connected in a low pressure circuit, and means for developing a counter-pressure which is greater than the pressure of the fluid in the low pressure circuit whereby to counteract the leakage of fluid from one of said circuits.

34. In a hydraulic actuator system, a hydraulic actuator, a single source of fluid pressure supply, means for conducting fluid from said source of supply to said actuator, means for conducting fluid from said source of supply to a point externally of said actuator, and means for causing the fluid from said single source to be delivered at one pressure to said actuator and at another pressure to the point positioned externally of said actuator.

35. In a hydraulic actuator system, a hydraulic actuator, a single source of fluid pressure supply, means for conducting fluid from said source of supply to said actuator, means for conducting fluid from said source of supply to a point externally of said actuator, and adjustable means for causing fluid from said single source to be delivered at one pressure to said actuator and at another pressure to the point positioned externally of said actuator.

36. In a fluid power system, a fluid actuator including a cylinder and piston construction, a fluid circuit operatively associated with said hydraulic actuator, a fluid pressure generating mechanism in said fluid circuit for producing a fluid flow under pressure to operate said actuator, said mechanism including means for timingly controlling the flow of fluid to and from said mechanism, and means within said fluid pressure generating mechanism for automatically adjusting and maintaining said flow control means free from fluid leakage.

37. In a fluid power system, a fluid actuator including a cylinder and piston construction, a fluid circuit operatively associated with said hydraulic actuator, a fluid pressure generating mechanism in said fluid circuit for producing a fluid flow under pressure to operate said actuator, said mechanism including rotary and axially adjustable means for timingly controlling the flow of fluid to and from said mechanism, and means within said fluid pressure generating mechanism for automatically adjusting and maintaining said flow control means free from fluid leakage.

ERNEST J. SVENSON.